United States Patent [19]

Denby

[11] Patent Number: 5,668,308

[45] Date of Patent: Sep. 16, 1997

[54] LEAKAGE DETECTION

[76] Inventor: Carl Denby, 51 Park Avenue, Normanton, United Kingdom, WF6 2DR

[21] Appl. No.: 624,393

[22] PCT Filed: Oct. 7, 1994

[86] PCT No.: PCT/GB94/02196

§ 371 Date: Apr. 4, 1996

§ 102(e) Date: Apr. 4, 1996

[87] PCT Pub. No.: WO95/10033

PCT Pub. Date: Apr. 13, 1995

[30] Foreign Application Priority Data

Oct. 7, 1993 [GB] United Kingdom ............ 9320627

[51] Int. Cl.[6] ............................................. G01M 3/32
[52] U.S. Cl. ............................................. 73/49.2
[58] Field of Search .................... 73/40, 40.5 R, 73/49.2 T, 49.2 R

[56] References Cited

U.S. PATENT DOCUMENTS

| 4,993,257 | 2/1991 | Lagergren | 73/49.2 T |
| 5,216,914 | 6/1993 | Horner | 73/49.2 |

FOREIGN PATENT DOCUMENTS

| 0202133 | 9/1986 | Japan | 73/49.2 T |
| 0210837 | 8/1989 | Japan | 73/49.2 T |
| 0232225 | 9/1989 | Japan | 73/49.2 T |

OTHER PUBLICATIONS

Niaki et al., "Underground Tank Leak Detection Methods: A State-of-the-Art Review", EPA publication: EPA/600/2-86/001, pp. 90-90. Jan. 1986.

*Primary Examiner*—Michael Brock
*Attorney, Agent, or Firm*—Andrus, Sceales, Starke & Sawall

[57] ABSTRACT

A method of testing the leakage rates from tanks for containing volatile liquids such as petrol or diesel, with a view to determining whether the tank leaks excessively. The tank is at least partially filled during testing in order to save time. The leakage is detected by sealing the tank and measuring the drop in pressure in the tank over a period of time. In order to measure the rate of leakage, a first measurement is taken during which an amount of 380 ml is removed from the tank over a short period whilst otherwise sealed, with the resultant pressure drop being measured as a calibrated value. The tank is then re-sealed and the pressure drop over the period of an hour is compared with the calibrated value.

20 Claims, 4 Drawing Sheets

LEAKAGE DETECTION

This invention relates to a leakage test which is particularly suitable for the testing of underground storage tanks such as those found at petrol stations and chemical works, and even milk storage tanks.

Because leakage from underground storage tanks cannot be readily detected externally, internal testing methods are commonly used. Some years ago the most common method of testing the integrity of underground storage tanks was a high pressure test. This method includes the required step of removing the contents of the tank, these normally being volatile and prone to spontaneous combustion under the influence of elevated pressures, before supplying the tank with gas at high pressure. In order to detect leakage from the tank, the tank is otherwise sealed off at the input and output connections, the pressure inside the tank is elevated to around 3,500 mb above atmospheric pressure and the pressure is read both initially and after some time finally by means of a pressure gauge fluidly connected to the tank interior. The detection of a pressure loss indicates the possibility of a leaking tank.

There are significant drawbacks to this high pressure testing method. The need to first empty the tank leads to a time consuming and costly test which requires a second tank in which the normal contents can be stored during the test. Perhaps the greatest drawback is that of insensitivity. Most underground spirit-containing tanks have large ullage spaces, and only relatively small changes in gas pressure caused by normal rates of leakage during a test. Furthermore, the high pressures are monitored by mechanical pressure gauges, which are by nature insensitive to the pressure changes created by these normal rates of leakage. It is thought that substantial leakages went unnoticed by this testing method, which has resulted in the release of significant quantities of pollutant into environments surrounding the leaking tanks. Furthermore, the amount of energy stored in a tank at such an elevated pressure is excessive and can be dangerous both to the tank itself and the testing personnel.

New and stricter legislation has now been introduced in some countries to protect the environment by placing lower limits on the amount of leakage permissible from a store of liquid pollutant (defined by the authorities as any liquid other than water), and these standards have made the high pressure tests obsolete in those countries. According to current legislation in Europe and the United States of America the integrity of a pollutant storage tank will be certified only if its rate of leakage into the surrounding environment is less than of 380 ml during the course of a single hour. Consequently, any testing methods which the authorities approve must be able to reliably detect a leakage occuring at the specified rate.

Thus, and particularly in the case of the largest of tanks, only a small number of testing methods have been approved by the authorities for meeting this sensitivity requirement.

According to one known test, an electronic sensor is lowered into the liquid contents of a tank, and the liquid level is directly measured. This test is however time-consuming and is generally undertaken overnight when the tank is out of use, and the long monitoring period can lead to inaccuracies due to effects such as thermal expansion of the tank and its contents. It is also inherently-unsuitable for tanks containing liquids which react with the material of the sensor, such as acids.

In another known test, the tank is sealed and a vacuum is applied. Air entering the tank via a leak site causes a bubbling sound which can be picked up by sonic monitoring equipment. This monitoring method however cannot detect leaks in pipelines associated with the tanks which require separate testing.

All of the known tests suffer from deficiencies where the tank is surrounded by a water table. Depending on the relative levels of liquid inside and outside the tank, a leak can be exacerbated, completely masked, or water can enter the tank via the leak site. With certain liquids, an influx of water can be detected as it settles at the base of the tank, but this is impossible for other liquids with which water readily mixes or forms an emulsion.

It is furthermore the case that the currently approved methods of testing can be inhibitively expensive, as a combined result of the down-time required and the actual cost of the equipment required for the testing. Indeed in some cases businesses have become unviable and have closed due to the prohibitive cost of the presently approved methods.

Until now it has been believed that a test utilising a method of testing during which the gas pressure is monitored would be unworkable under present regulatory conditions. Such testing by pressure monitoring has in the part been discounted for a number of reasons. Due to the regulations against high pressure testing, it was thought that insufficient sensitivity could be obtained to obtain meaningful results within an economic timescale, bearing in mind that a tank must be kept out of service during a test of its leakage rate. Furthermore, because the known pressure monitoring test requires the removal of the tank's contents before testing, pressure monitoring was thought to be an inconvenient and inefficient method made obsolute by the new testing methods.

The applicant has however surprisingly found that a pressure monitoring test is workable under present regulations, and indeed a number of significant advantages accrue.

According to the present invention, there is provided a method of testing for fluid leakage from an underground storage tank normally containing a liquid pollutant, the test comprising the steps of fluidly sealing the tank, fluidly connecting a pressure sensitive means to the interior of the tank, and monitoring the pressure sensed over a period of time, characterised in that the monitoring is carried out whilst the tank is partially filled with its normal liquid contents and also partially filled with a gas, the effect of allowing the normal liquid contents to remain being to amplify pressure variations caused by leakage from the tank.

The reservoir is preferably only partially filled with the volatile liquid for the duration of the test, the remaining ullage space being filled with a gas. This is the condition in which a reservoir is found during everyday use.

The test is particularly suitable for the testing of large tanks having an ullage space above around 4,000 liters. Since the changes in pressure during a test are approximately inversely proportional to the volume of gas in the reservoir and any connecting conduits between the reservoir and the pressure sensitive means, it is preferred that the reservoir does not contain an excessive gas volume during testing. In order to achieve the desired sensitivity to test a leakage of 380 mls per hour, it is preferred that the test is carried out with an ullage space or gas volume at or less than around 4,000 Liters in the reservoir.

The test is preferably carried out at a pressure of between 250 mb above atmospheric pressure and 250 mb below atmospheric pressure. This upper limit affects the pressure above which it is generally considered safe to work without the risk of explosion or other damage to the tank and/or testing personnel, although the applicant considers that testing is possible at much higher pressures according to the present invention. At pressures below the lower limit, there is a danger of causing the collapse of an underground storage tank.

The choice of whether a reduced pressure, and elevated pressure, or indeed atmospheric pressure is used during the course of the test will depend on the prevalent conditions, particularly the height of the water level surrounding the tank compared to the level of liquid within the tank. It will be appreciated that, should these levels be similar, a test at atmospheric pressure will lead to little or no leakage occuring during the course of a test even if the tank would release liquid pollutant when the water table is at a lower level compared to that of its contents.

The method preferably includes the step of introducing a gas into the reservoir to elevate the pressure in the interior above atmospheric pressure. The use of an elevated pressure reduces the possibility of .erroneous test result due to a high water level surrounding the tank, which may tend to counteract the detection of a leak. The contents of the tank are forced from the site of a leak by the elevated internal pressure. This further facilitates the detection of the position of a leak site, since the emission of gas or fluid is detectable by means of a leak detector spray at the suspected site of the leak.

If the pressure is elevated, it is however essential that the pressure inside the reservoir be regulated to ensure that it does not rise past a safe level and preferably the pressure does not rise above approximately 200 mb above atmospheric pressure during monitoring.

The pressure sensitive means is preferably an electronic pressure transducer, which can preferably sense changes in pressure of one tenth of a millibar.

The said elevated pressure is preferably at least 50 mb above atmospheric pressure.

An elevated pressure of above in the region of 150 mb is preferred since this will generally ensure that the pressure inside the partially-filled tank (which may have a liquid level between 1 m and 3 m below ground level) exceeds pressure externally of the tank, irrespective of the prevailing height of the water table surrounding the tank, and a readily detectable leakage rate will be obtained if the tank leaks excessively in normal use.

The pressurised gas may be supplied by means of a high pressure gas supply, in which case a low pressure regulator is preferably provided to prevent the possible supply of excessive pressure within the tank. The regulator preferably embodies a pre-set pressure-relief valve, and the pressure at which this relief valve is actuated may be in the region of 30 mb above that of the said elevated pressure.

The gas supplied is preferably an inert and/or non-combustible gas such as oxygen-free nitrogen, which serves to inhibit explosions in the reservoir. Other gases which may be suitable include argon and helium, depending on their compatibility with the liquid contents of the tank.

Whilst allowing the contents of the tank to remain during the test, the achievement and maintenance of equilibrium within gas/liquid contents must be taken account of, since significant pressure variations may be caused by disturbance of the liquid particularly it it is a volatile spirit such as petrol. Therefore in carrying out the testing, efforts are preferably made to eliminate possible causes of fluid flow or other disturbances in the body of liquid, for if disturbances do occur, it may be necessary to allow time for the reservoir to once again reach equilibrium.

Where the reservoir is divided into two or more gas-filled compartments fluidly interconnected by the liquid contents, gas is preferably introduced into each compartment, or removed therefrom if the pressure is to be reduced, simultaneously to equalise pressures without causing fluid flow between the compartments.

Furthermore, where the reservoir comprises a main tank and a number of pipelines, it is preferred that the pipelines are sealed at least some distance from the main tank. By this method, an entire reservoir including its network of supply pipelines can be tested for leaks by allowing the elevated fluid pressure to permeate the system to the extent to which testing is required.

The reservoir may be a fuel tank at a petrol filling station comprising a tank body, a fill pipe, a vent and a suction line leading to the fuel dispenser pumps. It is to be noted that the prior and alternative methods do not take into account of leakage from the the network of supply pipelines connected to the main reservoir tank. However the suction line is in use fuel-filled and therefore according to the present invention may simply be blanked off by means of a spade plate, preferably close to the pump site so that the test includes the suction line itself.

The gas supply means may be sealingly connected to the opening of the fill pipe, and the vent may be sealingly connected to the fill pipe by means of a pressure balance tube.

An embodiment of the present invention will now be described by way of example only with reference to the accompanying diagrams, wherein.

Figure 1:
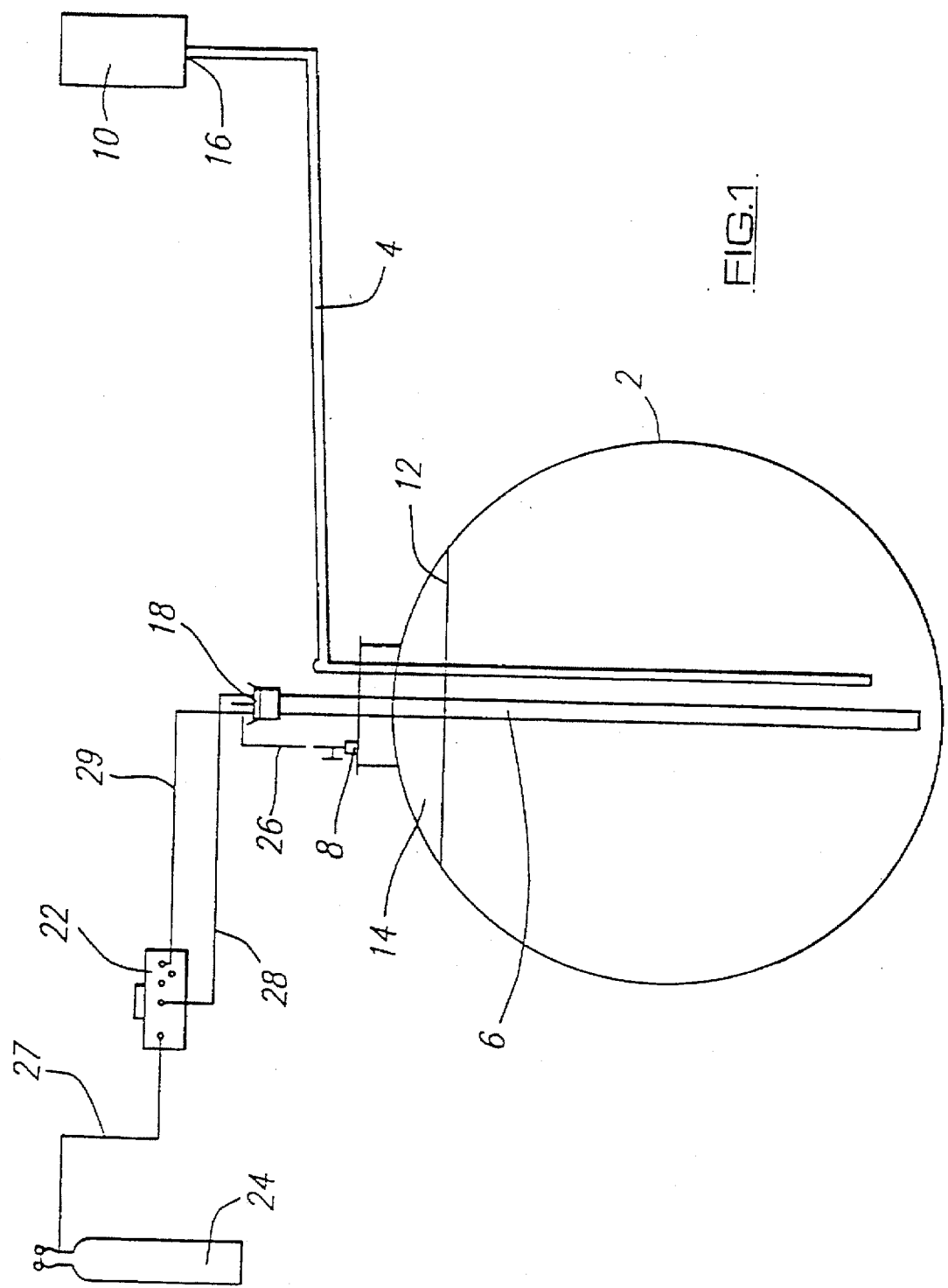
FIG. 1 is a schematic view of the a petrol tank at a filling station being tested according to an embodiment of the present invention.

Referring to the diagrams and firstly to FIG. 1, an underground petrol tank is shown to comprise a tank body 2, a suction line 4 leading from the base of the tank body to a pump dispenser 10, a fill pipe 6 and a vent pipe 8, which are standard features of filling station tanks to allow the provision of a continuous supply from the pump dispenser 10 by the regular filling of the tank 2 by means of the fill pipe, the vent being opened to prevent the build-up of excessive pressure within the tank during filling.

Figure 2:
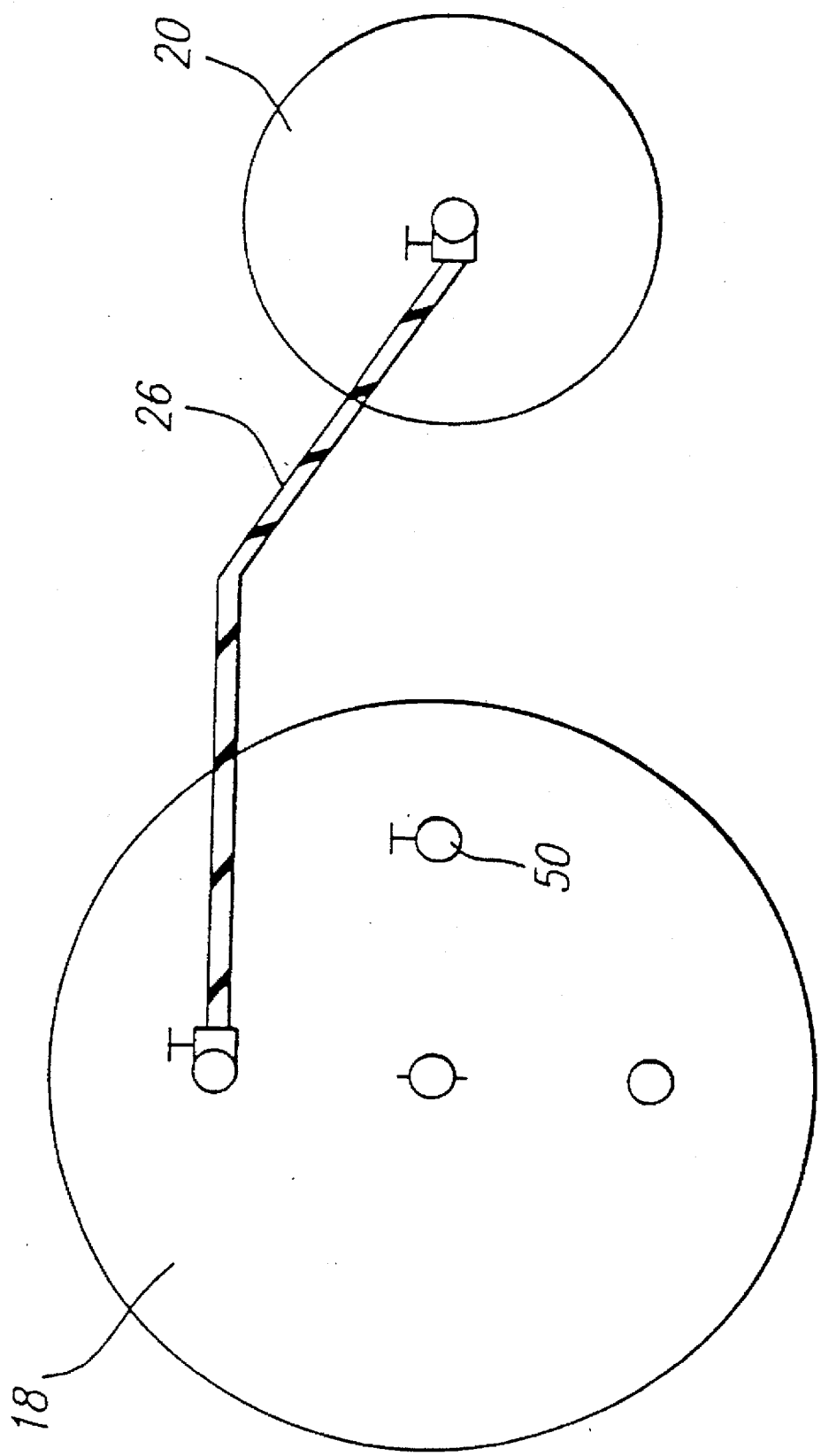
FIG. 2 is a schematic illustration of the tank connections made during the low-pressure test.

In the leakage test of the embodiment shown, the tank is filled almost fully to the level 12 shown to leave a small ullage 14 of up to 4000 Liters of gas-filled space in the tube. The tank must be isolated from the surrounding environment, and thus the supply lines must be blocked off. The suction line 4 is in use filled with the liquid product, and may simply be blanked off at the end 16 nearest the pump dispenser 10. The fill pipe 4 and vent 8 are capped off by means of a fill pipe cap 18 and a vent pipe cap 20 shown in greater detail in FIG. 2. These caps 18 and 20 are connected via a pressure balance tube 26, and the fill pipe cap 18 is connected to a control unit which in turn connects with a nitrogen, oxygen free (NOF) gas supply cylinder by means of a high-pressure nitrogen supply tube 27. The control unit connects with the fill pipe cap by means of two pipelines, a nitrogen supply line 29, and a pressure sensing line 28.

Figure 3:
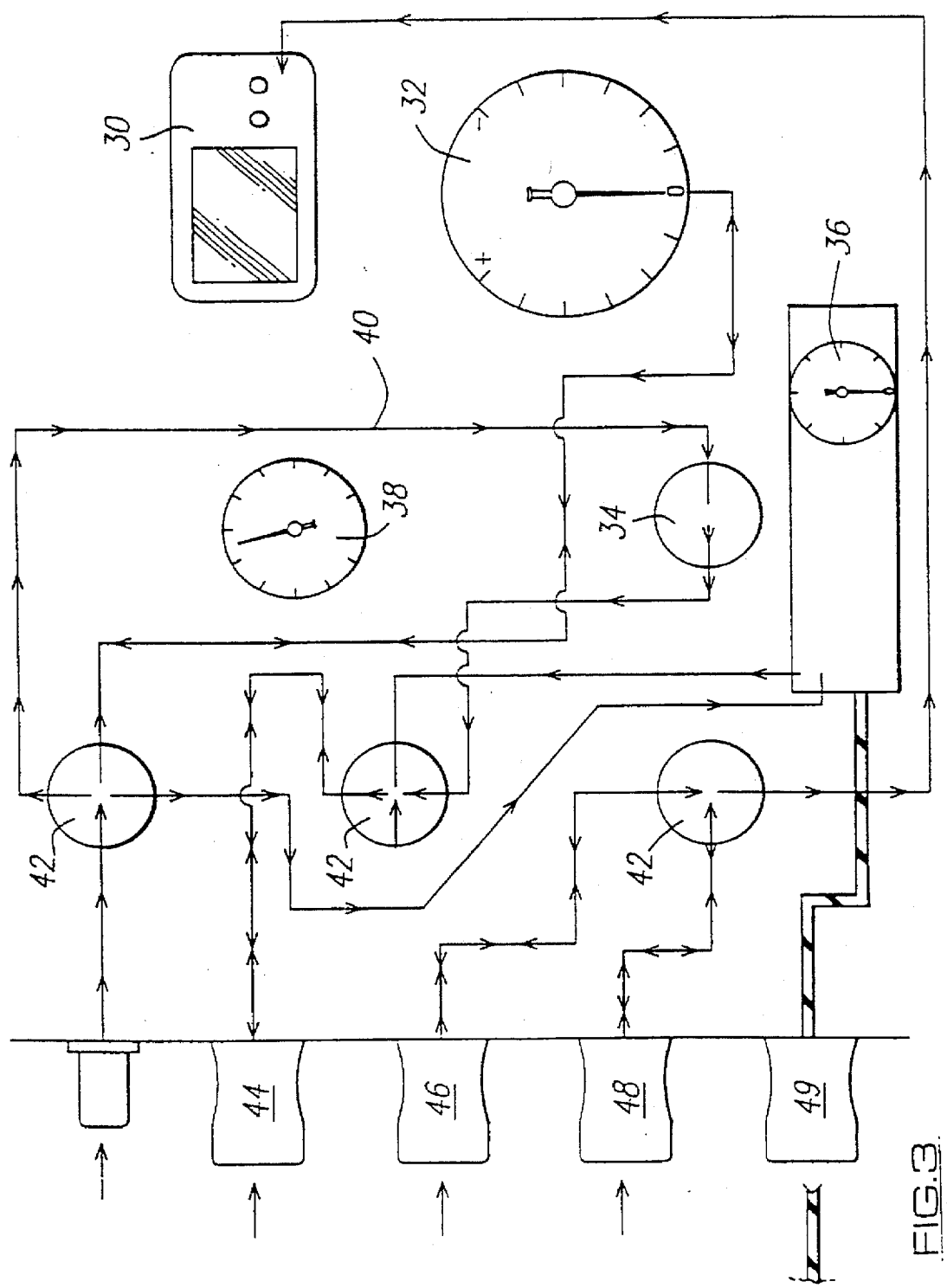
FIG. 3 is a schematic view of the test control unit utilised in this embodiment.

The control unit which forms a further aspect of the present invention is shown in greater detail in FIG. 3, and comprises various pipeline connections 40, inputs and outputs, multi-outlet precision control valves 42, an sensitive electronic pressure transducer 30, a pressure guage 32, a low pressure regulator 34, a vacuum pump 36 and a barometer 38. The transducer 30 sensor changes in pressure at incements of one tenth of a millibar.

In effecting the test once the connections shown in FIG. 1 are made, NOF is supplied to the control unit 22 by opening the valve of the gas cylinder 24, and this input pressure is monitored by the mechanical pressure gauge 32. The NOF is supplied to the tank 18 via the low pressure regulator 34 which ensures that the NOF is supplied at a low pressure below that at which the regulator is set, which in this embodiment is 220 mb, the output 44 and the supply pipe 29. The NOF supplied enters not only the fill pipe 6, but also the ullage 14 via the balance line 26 and vent pipe 8.

It is to be mentioned that, where the contents of the tank are volatile it may be preferably to apply a vacuum to the tank before supplying NOF so as to extract much of the initial oxygen content of the tank before the pressure is elevated.

The overall fluid pressure in the tank 2 is increased to approximately 190 mb by the gradual supply of NOF from the cylinder 24, at which time the supply lines are sealed and monitoring may begin.

This monitoring is achieved via the pressure return line 28, connected to an input 46 or 48 which each lead to the electronic pressure transducer 30. The transducer was chosen particularly for its safety characteristics, as it is imperative that no electrical sparking or other combustive elements are caused by the operation of the transducer. The pressure transducer used is manufactured by A Drug, a British company, based in Leicestershire under the model reference DPI 700 IS.

Once the connecting valves between the tank 2 and the transducer 30 are opened, the pressure is first allowed to stabilise. Once equilibrium is reached, perhaps at 180 mb, a subsequent pressure drop will most likely indicate leakage from the tank. Other considerations such as atmospheric pressure and temperature changes during the course of the test can be to blame, however these can also be monitored by means of the barometer 38 and a thermometer, and the test can be repeated if it is suspected that these changes are responsible for the pressure variation within the tank.

Figure 4:
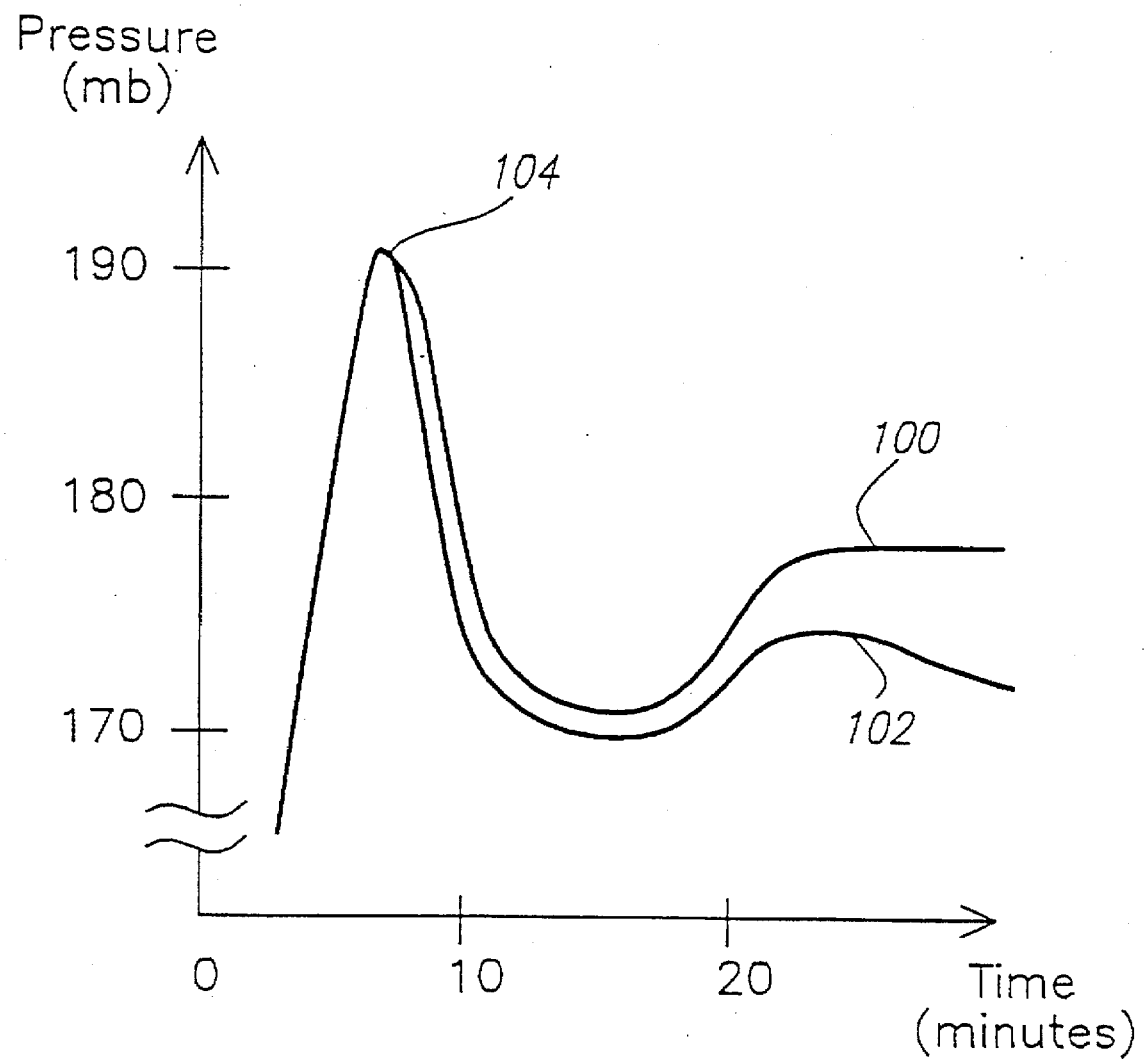
FIG. 4 is a graph illustrating pressure monitored during a test according to the present invention.

A graph illustrating the pressure variation with time during testing is shown in FIG. 4. Curve 100 shows the results of monitoring for a tank which does not leak, whereas curve 102 illustrates the results obtained during testing of a leaking tank.

The highest pressure is attained at point 104 on the curves, at which point the supply of NOF is cut off. The pressures then vary considerably over the subsequent fifteen minute period, at which point a saturated vapour pressure is attained and the pressure in a fully sealed tank stabilises, as illustrated by curve 100. In the leaking tank, however, the pressure gradually decreases after the attainment of a saturated vapour pressure, and indeed curve 102 shows that the pressure in a leaking tank, although initially at the same elevated pressure as the fully sealed tank, will always be less than that for the sealed tank, as would be expected.

One problem experienced with other types of testing is the detection of the point at which the 380 ml/hour rate of leakage is exceeded, since for example the electronic liquid level detector must take account of the surface area of liquid in the tank. With the method of the present invention however, a 380 ml amount of liquid is first removed by means of a calibration valve and a submerged tube whilst the tank pressure is monitored at the elevated pressure. Thereby an accurate and calibrated value is obtained for the pressure drop limit which takes account of all prevailing atmospheric conditions. The pressure drop shown on the transducer is then used to provide an upper limit of pressure drop allowed during a one-hour test. If this pressure drop limit is exceeded, an unacceptable leakage rate from the tank has been found. Alternatively, this limit may be calculated theoretically based on the volume of gas within the tank and other variables, however this theoretical approach is likely to be more time-consuming and less accurate.

Once an unacceptably large leak has been found, it may be located by means of for example a leak revealing coating spray, and the vacuum pump 36 may be operated to prevent further pollution of the surrounding environment by holding the spirit product in the tank pending the arrival of a tanker vehicle to remove the product from the tank and the repair of the leak.

By the use of two or more pressure return lines and connections 46, 48 from different tanks, a plurality of tanks may be tested simultaneously.

It will be appreciated that the present invention is not limited to the pressure and ullage values mentioned in the above embodiment, and that a range of these values is possible according to the invention, depending upon the limits of accuracy and safety required and furthermore it is the case that an equivalent procedure may also be effected using a medium vacuum pressure inside the tank if desired.

I claim:

1. A method for the testing for fluid leakage from a storage tank normally containing a liquid pollutant, the test comprising the steps of fluidly sealing the tank, fluidly connecting a pressure sensitive means to the interior of the tank, and monitoring the pressure sensed over a period of time, the monitoring being carried out whilst the tank is partially filled with its normal liquid contents and also partially filled with a gas, the tank comprising two gas-filled compartments located above and fluidly interconnected by the liquid contents, and wherein the test comprises one of admitting gas directly to, and extracting gas directly from, each of said compartments.

2. A method according to claim 1 wherein the test is carried out at a pressure between 250 mb above atmospheric pressure and 250 mb below atmospheric pressure.

3. A method according to claim 1 including the step of introducing a gas into the tank after sealing thereof to elevate the pressure in the interior.

4. A method according to claim 3 wherein pressurised gas is supplied by means of a high pressure gas supply, and a low pressure regulator is used to prevent the possible supply of excessive pressure to the tank.

5. A method according to claim 3 wherein the gas is an inert non-combustible gas.

6. A method according to claim 5, wherein the gas is one selected from the group of oxygen-free nitrogen, argon and helium.

7. A method according to claim 1 wherein gas is introduced into each compartment, or removed therefrom if the pressure is to be reduced, simultaneously to equalise pressures without causing fluid flow between the compartments.

8. A method according to claim 1 for testing a fuel tank at a petrol filling station comprising a tank body, a fill pipe, a vent and a suction line leading to fuel dispenser pumps, wherein the said two gas-filled compartments are a) a space above the main body of the liquid contents, and b) a space above the liquid contents within the fill pipe.

9. A method according to claim 8 wherein the suction line is blanked off close to the pump site so that the test includes the suction line itself.

10. A method according to claim 8 wherein a gas supply means is sealingly connected to the opening of the fill pipe.

11. A method according to claim 8 wherein the vent is sealingly connected to the fill pipe by means of a pressure balance tube.

12. A method for the testing for fluid leakage from a storage tank normally containing a liquid pollutant and having a fill pipe and a vent, the test comprising the steps of fluidly sealing the tank, fluidly connecting a pressure sensitive means to the interior of the tank, and monitoring the pressure sensed over a period of time, the monitoring being carried out whilst the tank is partially filled with its normal liquid contents leaving a head space which is filled with a gas, and wherein the test further comprises balancing the pressure in the head space and a space above the liquid contents within the fill pipe during a pressure change in the tank.

13. A method according to claim 12 wherein the test is carried out at a pressure between 250 mb above atmospheric pressure and 250 mb below atmospheric pressure.

14. A method according to claim 12 including the step of introducing a gas into the tank after sealing thereof to elevate the pressure in the interior.

15. A method according to claim 14 wherein pressurised gas is supplied by means of a high pressure gas supply, and a low pressure regulator is used to prevent the possible supply of excessive pressure to the tank.

16. A method according to claim 14 wherein the gas is an inert non-combustible gas.

17. A method according to claim 16, wherein the gas is one selected from the group of oxygen-free nitrogen, argon and helium.

18. A method according to claim 12 wherein gas is introduced into the head space and the space within the fill pipe, or removed therefrom if the pressure is to be reduced, simultaneously to equalise the pressures without causing fluid flow therebetween.

19. A method according to claim 12 wherein a gas supply means is sealingly connected to an opening of the fill pipe.

20. A method according to claim 12 wherein the head space is sealingly connected to the fill pipe by means of a pressure balance tube.

* * * * *